Aug. 15, 1961  O. W. LIVINGSTON  2,996,654
NON-LINEAR FEEDBACK CIRCUIT FOR GENERATORS
Filed April 16, 1958
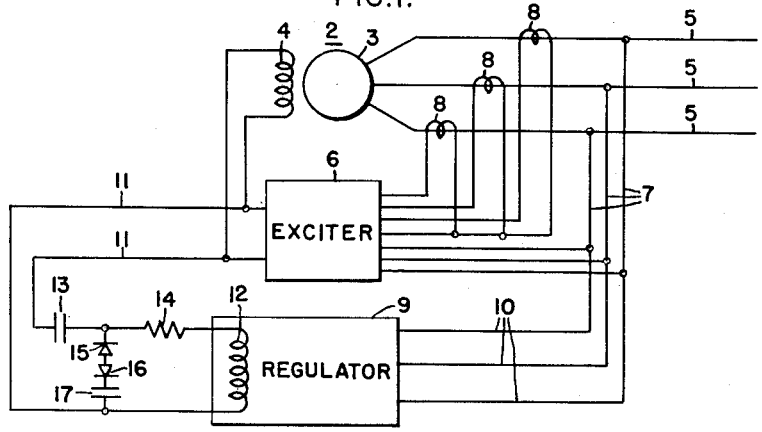
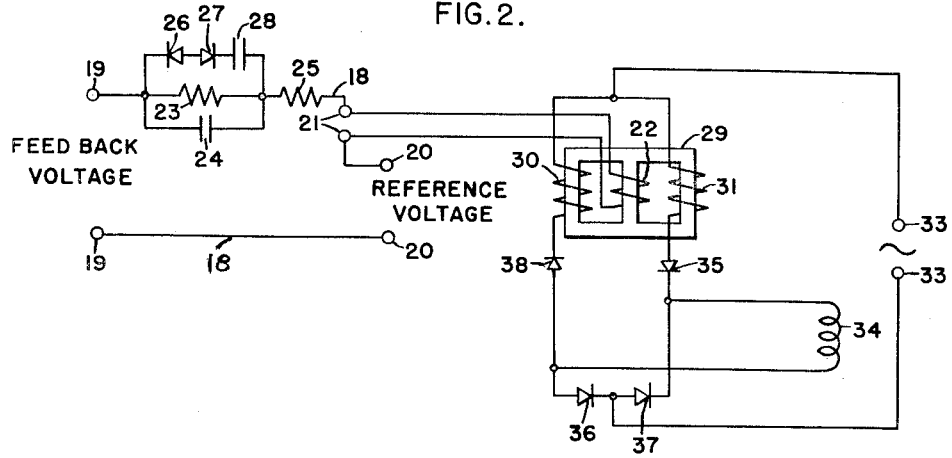
INVENTOR:
ORRIN W. LIVINGSTON,
BY Melvin M. Goldenberg
HIS ATTORNEY.

United States Patent Office 2,996,654
Patented Aug. 15, 1961

2,996,654
NON-LINEAR FEEDBACK CIRCUIT FOR GENERATORS
Orrin W. Livingston, Waynesboro, Va., assignor to General Electric Company, a corporation of New York
Filed Apr. 16, 1958, Ser. No. 729,010
1 Claim. (Cl. 322—25)

This invention relates to improvements in control systems. More specifically, it relates to a novel means for controlling signal feedback circuits constituting a part of control or regulating systems.

In systems utilizing electrical signals fed back from the output of a device being controlled and proportional to an output characteristic of the device, it may be found necessary to vary the speed of response of the system. To this end, various circuits usually comprising resistive and capacitive impedance elements have been utilized and designated in the art as "lag" and "lead" circuits. Such circuits may be used to add stability to a fast-acting control circuit or may be added to a circuit to decrease the time which it takes to respond to changes in the output characteristic being controlled. These circuits have their limitations in the effects they can exert over a control and also constitute energy consuming components at all times. Further, since they are usually linear elements they are exercising some degree of control over the circuit and in many situations it is desired that they be effective only when the feedback signal exceeds a predetermined condition such as magnitude or rate of change of magnitude.

Therefore, it is an object of this invention to provide a novel apparatus utilizing non-linear components in the feedback circuit of a control system to vary the response of the system to feed back signals departing from predetermined conditions.

It is another object of this invention to provide a novel apparatus utilizing non-linear components in the feedback loop of a control system to either increase or decrease the feedback signal supplied to a control element in a utilization circuit when the feedback signal departs from predetermined conditions.

It is still another object of this invention to provide a novel apparatus utilizing non-linear components in the feedback loop of a control system which consumes a minimum amount of energy when they are not functioning as active circuit elements.

It is a further object of this invention to provide a novel control system utilizing semiconductor diodes in a feedback which may be connected in a plurality of arrangements in order to control the response time of the system.

Specifically, in the use of fast-acting regulation systems such as those provided to control the output of dynamoelectric machines, including alternating current generators, quite often it is found necessary to stabilize the system by providing degenerative feedback in some portion thereof in order to avoid extreme overshoot and instability upon the occurrence of a large error signal due to a marked change in the output of the apparatus being controlled. For instance, in the regulation of alternating current generators, it has been found desirable to degeneratively feed back the alternator field voltage to an element exercising control over the regulator to stabilize the system. Such an arrangement will normally produce the desired stabilization under steady-state conditions. However, under certain transient conditions such as the clearing of a single-phase fault in a polyphase generator, the effect may be to actually prolong the overvoltage supplied to the field by the exciter. Consequently, it is necessary to alter the response of the stabilizing feedback loop under these circumstances in order that a voltage overshoot developed in the machine field does not act to provide a regulator output in the wrong direction. However, the need for stabilizing of an error feedback signal in a fast-response control system is not limited to this application and, in general, may be necessary in any high speed system. Further, the application of the invention is not limited to this mode of operation, but rather is generally applied to modify the ability of a feedback loop to pass signals.

Therefore, it is a still further object of this invention to provide an improved regulating system for dynamoelectric machines utilizing non-linear semiconductor diodes in a feedback loop so that fast response is achieved and instability avoided.

Briefly, in one embodiment of my invention I provide a pair of reversely connected semiconductor diodes of the type having a critical reverse voltage characteristic (above which the voltage remains substantially constant) connected in the feedback loop of a control system in such a manner so that they will normally act as an open circuit until the voltage appearing across one of them reaches a value fixed by the characteristic of the diode. In the event that the feedback voltage exceeds the critical voltage characteristic of the diode, the diodes effectively become a part of the circuit and function to change the amount of feedback voltage supplied to a control element in a utilization circuit from that normally available.

The subject matter which I regard as my invention is particularly pointed out and distinctly claimed in the concluding portion of this specification. My invention, however, both as to its structure and manner of operation together with further objects and advantages thereof, may best be understood by reference to the following description taken in connection with the accompanying drawing in which:

FIGURE 1 is a schematic illustration of a regulator for an alternating current generator incorporating my invention; and FIGURE 2 is a schematic illustration of an error feedback and control circuit incorporating an alternative embodiment of my invention.

Referring to FIGURE 1 of the drawing, there is illustrated a control system comprising a dynamoelectric machine such as a polyphase alternating current generator designated generally by reference numeral 2. This machine includes the conventional armature 3 and field winding 4 to which is applied a direct current voltage for purposes of excitation. A plurality of buses 5 are connected to the terminals of the machine 2 and supply to the load the voltage generated thereby. Direct current voltage for the field winding 4 is supplied by an exciter 6. The exciter is illustrated in diagrammatic form and may be constituted by any number of devices. It may take the form of a rotating machine mounted on the same shaft as the armature 3 of the generator or, alternatively, it may be constituted by a static device such as is shown in the patent to Thompson et al. No. 2,454,582, issued November 23, 1948. Energy for a static exciter of the type shown in the Thompson et al. patent may be supplied from the terminals of the generator 2 and may have two components. The first is an alternating voltage component proportional to the load voltage supplied by a plurality of leads 7 connected to the output circuit of the alternator. The second is a component of alternating current energy proportional to the generator load current which may be supplied through the current transformers 8 illustrated diagrammatically in the drawing. In a static exciter of this type, the two alternating voltage components are rectified by a suitable means and field 4 is thus supplied with direct current energy which varies directly with the load of the generator so that some degree of regulation is inherent in the exciter itself. The exciter 6 is controlled by a regulator 9 which derives a feedback signal proportional to load voltage from the leads 10 connected to the leads 7. The regulator may be constituted by any of the devices well-known in the art and, for instance, may be of the static type employing magnetic amplifiers. Alternatively, it could be constituted by tubes of the vacuum or gas-filled variety to supply essentially a direct current control signal proportional to, as in this case, the load voltage or any other machine characteristic to which it is desired to make the control responsive.

In many applications, it has been found desirable to make the regulation and excitation apparatus for systems of this type to be of the fast-response type in order to very closely control the output of the machine. As has been pointed out, under these circumstances it has been found necessary to stabilize the system by providing a degenerative feedback loop from the exciter 6 to the regulator 9. In order to provide a stabilizing or damping effect on the output of the regulator such that when it responds to feedback signal indicating a departure from a predetermined output voltage and acts to vary the generator excitation in the proper direction, the time the system takes to bring the generator back to the predetermined output is held to a minimum. The leads 11 feed a control element forming a part of the regulator 9 such as the winding 12. A capacitor 13 and resistor 14 may be provided in the circuit and together with winding 12 function as a lag network and provide stabilization under steady-state conditions. In the system illustrated, if a single-phase fault should occur, the voltage in the faulting phase would go to zero and the current would considerably increase. Upon the clearing of the fault, the current would drop suddenly and the polarities are such that the effect would be to cause the output of the exciter 6 to increase. If this signal is fed back to the regulator 9 through the leads 11, it would tend to produce a regulator output in the wrong direction.

In accordance with my invention, I provide a pair of reversely connected semiconductor diodes 15 and 16 connected across the winding 12 between the leads 11. These diodes may take the form of the so-called "Zener" diode, which has the characteristic of offering an infinite impedance to a voltage of reverse polarity until the voltage reaches a predetermined amount fixed by the characteristic of the diode. At this point, the diode will pass current in the reverse direction while the voltage remains substantially constant. Thus in the circuit illustrated, if a voltage of either polarity appears on the leads 11 and should exceed the "Zener" characteristic of the particular Zener diode on which the reversed voltage is impressed, that diode will pass current thereby limiting the voltage across the winding 12 to the amount fixed by the "Zener" characteristics. In some situations, it may be found desirable to add additional impedance in series with the diodes 15 and 16, such as a capacitor as shown at 17, in order to limit the current therethrough and their effect and prevent them from undershooting the value it is desired to reach.

While in the particular circuit illustrated two Zener diodes of approximately equal characteristics have been found particularly effective, it is possible to use such diodes with unequal reverse voltage breakdown characteristics so that the response to feedback signals of one polarity is not equal to the response to feedback signals of the opposite polarity. Alternatively, if the non-linear action is desired in only one direction, it is possible to use only one Zener diode.

It should be understood that this invention is one of general application and is illustrated in a specific circuit form in order to show a particular application wherein its advantages result in a unique operation. However, generally speaking, the invention is concerned with the provision of reversely connected semiconductor diodes of the type described in a number of arrangements in a feedback circuit so that their non-linear qualities can be used to vary the feedback signal through a control element to maintain it within predetermined limits or to increase it non-linearly under other conditions. Thus the invention contemplates that two or more such diodes can be used in series in each reversely connected pair of higher operating voltages are desired and the diodes may be connected in an unsymmetrical manner, that is, with unequal numbers of diodes reversely connected to each other in series.

To illustrate another application of this principle, I show in FIGURE 2 another embodiment of my invention. In this figure, pairs of leads 18 constitute a part of the feedback loop in a control circuit. A feedback voltage is applied to a pair of input terminals 19 and is compared in the feedback circuit with a reference voltage applied to a pair of terminals 20. The difference between these two voltages appears across a serially connected resistor 23, a resistor 25 and the control element 22 of a utilization device which, in turn, may control the output of another device supplying control or energizing potential in a manner to be explained in greater detail hereinafter. In this circuit, my invention takes the form of the resistor 23 and a capacitor 24 connected in parallel therewith in order to provide some degree of stabilization. The resistor 25 may be provided in order to limit the current through the control element 22. Connected in parallel with the resistor 23 are a pair of reversely connected Zener diodes 26 and 27 and a capacitor 28. The basic operation of this circuit is that the diodes 26 and 27 act as an open circuit until the error voltage which is manifest as rate of change of voltage difference between the feedback voltage and the reference voltage exceeds a predetermined amount. If it is desired to make this circuit responsive to the magnitude of the voltage difference, the capacitor 28 could be substituted for by a resistor or a combination of resistance and inductance. However, with a large error voltage, the drop across resistor 23 becomes large enough to cause the diodes 26 and 27 to conduct thereby shunting the resistor 23 to cause an increase in the error signal applied to the control element 22. In this circuit, the diodes 26 and 27 function to increase the feedback signal under abnormal error conditions and, therefore, is to be distinguished from the circuit illustrated in FIGURE 1 wherein the connection is such to limit the negative feedback signal in the manner described.

A utilization circuit for the circuit illustrated in FIGURE 2 may take the form of a magnetic amplifier having a saturable core 29. Main load windings 30 and 31 may be wound about the outer legs of the core 29 and supplied from an alternating current source 32 connected to a pair of terminals 33. The rectifiers 35, 36, 37 and 38 constitute a full-wave rectifying circuit in order to provide a direct current flow through the winding 34 in the manner well-known in the art. The winding 34 may constitute the field winding of a dynamoelectric machine or may, in turn, control another amplifier. This portion of FIGURE 2 is illustrated only as an example of an application for a control circuit incorporating my invention.

Although in accordance with the provisions of the patent statutes this invention is described as embodied in concrete form and the principle has been explained together with the best mode in which it is now contemplated applying that principle, it will be understood that the apparatus shown and described is merely illustrative and the invention is not limited thereto since alterations and modifications will readily suggest themselves to persons skilled in the art without departing from the true spirit of the invention or from the scope of the annexed claim.

What I claim as new and desire to secure by Letters Patent of the United States is:

In a control system for a dynamoelectric machine including an armature circuit and a field winding, means for supplying unidirectional voltage to said field winding, a regulator responsive to a machine output characteristic for controlling said means, the improvement comprising a control element in the regulator, a circuit connected between the field winding and said control element, and a pair of reversely connected semiconductor diodes having predetermined critical reverse voltage characteristics connected in said circuit in parallel with said control element to limit a characteristic of the voltage thereacross.

References Cited in the file of this patent

UNITED STATES PATENTS

| | | |
|---|---|---|
| 2,118,644 | Garman | May 24, 1938 |
| 2,140,349 | Dawson | Dec. 13, 1938 |
| 2,295,393 | Exner | Sept. 8, 1942 |
| 2,725,517 | Rogers | Nov. 29, 1955 |
| 2,773,233 | Marcks | Dec. 4, 1956 |
| 2,789,254 | Bodle et al. | Apr. 16, 1957 |
| 2,852,680 | Radcliffe | Sept. 16, 1958 |
| 2,854,651 | Kircher | Sept. 30, 1958 |
| 2,905,885 | Burt | Sept. 22, 1959 |
| 2,929,983 | Abell | Mar. 22, 1960 |